United States Patent
Biber et al.

(10) Patent No.: US 11,953,640 B2
(45) Date of Patent: Apr. 9, 2024

(54) PRESSURE COUPLING CHAMBER FOR HYDROPHONE CALIBRATION

(71) Applicant: TUBITAK, Ankara (TR)

(72) Inventors: Alper Biber, Kocaeli (TR); Oleksandr Golyk, Kocaeli (TR); Ata Can Çorakçi, Istanbul (TR)

(73) Assignee: TUBITAK, Ankara (TR)

( * ) Notice: Subject to any disclaimer, the term of this patent is extended or adjusted under 35 U.S.C. 154(b) by 260 days.

(21) Appl. No.: 17/607,010

(22) PCT Filed: Apr. 21, 2020

(86) PCT No.: PCT/IB2020/053753
§ 371 (c)(1),
(2) Date: Oct. 27, 2021

(87) PCT Pub. No.: WO2020/222084
PCT Pub. Date: Nov. 5, 2020

(65) Prior Publication Data
US 2022/0214472 A1    Jul. 7, 2022

(30) Foreign Application Priority Data
Apr. 29, 2019 (TR) ................. 2019/06367

(51) Int. Cl.
*G01V 13/00* (2006.01)
*G01H 3/00* (2006.01)
(Continued)

(52) U.S. Cl.
CPC ............. *G01V 13/00* (2013.01); *G01H 3/005* (2013.01); *G01N 29/30* (2013.01); *G01V 1/186* (2013.01)

(58) Field of Classification Search
CPC ......... G01V 13/00; G01H 3/005; G01N 29/03
See application file for complete search history.

(56) References Cited

U.S. PATENT DOCUMENTS 2,918,651 A    10/1954 Podolak et al.
3,121,211 A *   2/1964 Eskin .................. H04R 29/00
                                                    367/141

(Continued)

OTHER PUBLICATIONS

ANSI/ASA S1.20-2012 (Revision of ANSI S1.20-1988 (R2003))—Procedures for Calibration of Underwater Electroacoustic Transducers.

(Continued)

*Primary Examiner* — Isam A Alsomiri
*Assistant Examiner* — Abdallah Abulaban
(74) *Attorney, Agent, or Firm* — Crose Law LLC; Bradley D. Crose

(57) ABSTRACT

The present invention is a pressure coupling chamber (1) developed for comparison calibrations of acoustic pressure-sensitive hydrophone (2) in the frequency range from Hz to 1 kHz. A hydrophone (2), reference receiver unit (3) and acoustic source (6) under test are acoustically coupled in the chamber through the air-filled medium inside the pressure coupling chamber (1). Acoustic sources (6) that are going to create acoustic pressure in the pressure coupling chamber (1), placed on the side walls of the chamber (1) to surround the pressure-sensitive active surface of hydrophone (2), are driven to create a hydrostatic pressure effect in the related frequency range in the chamber. Calibration of tested hydrophone (2) with comparison method is carried out by measuring the output voltages of tested hydrophone (2) and the reference receiver unit (3).

4 Claims, 2 Drawing Sheets

(51) Int. Cl.
  *G01N 29/30* (2006.01)
  *G01V 1/18* (2006.01)

(56) References Cited

U.S. PATENT DOCUMENTS

| | | | |
|---|---|---|---|
| 3,224,246 | A | 12/1965 | Schloss et al. |
| 3,659,255 | A | 4/1972 | Trott |
| 4,205,394 | A | 5/1980 | Pickens |
| 4,375,679 | A * | 3/1983 | Park, Jr. ............... G01V 13/00 |
| | | | 367/13 |
| 2015/0234089 | A1 | 8/2015 | Dakin |

OTHER PUBLICATIONS

EN 60565 Underwater acoustics—Hydrophones—Calibration in the frequency range 0,01Hz to 1MHz.
Robert J. Bobber. Underwater Electroacoustic Measurements. Peninsula Publishing, 333 p., ISBN 0-932146-19-8.
Joseph F. Zalesak. Advances in Transfer Coupler Reciprocity. Proceedings of 2004 NCSL International Workshop & Symposium, Salt Lake City, Jul. 11-15, 2004.
W H Slater W.H., S E Crocker S.E., and S R Baker S.R. A primary method for the complex calibration of a 20 hydrophone from 1 Hz to 2 kHz. Metrologia 55 (2018) 84-94.

* cited by examiner

PRESSURE COUPLING CHAMBER FOR HYDROPHONE CALIBRATION

TECHNICAL FIELD OF THE INVENTION

This invention relates to a system developed for the calibration of acoustic pressure sensitive hydrophone elements.

STATE OF THE ART

Hydrophone, an electro-acoustic transducer that converts the acoustic signals formed in the aquatic medium into electrical signals, is used in the field of underwater acoustics.

In order to measure the amplitude of the acoustic pressure accurately, the hydrophone element must be calibrated in the corresponding frequency band. Calibration of the receiving sensitivities of electro-acoustic transducers can be carried out by reciprocity, which is the primary (absolute) method, or comparison, which is the secondary (relative) method. No reference is needed for primary calibration.

For secondary calibration of the receiving sensitivities of electro-acoustic transducers, a reference element of known sensitivity value is required, and the transducer of unknown receiving sensitivity is calibrated by comparing it to the reference element of known value.

Calibration method is selected by considering the frequency range and targeted measurement uncertainty. Furthermore, the technical features of the hydrophone element to be calibrated are important in determining the calibration method. For the calibration of hydrophone elements by reciprocity method in the upper audible and ultrasonic frequency band, free field conditions are provided in controlled test tanks.

As the frequency of the acoustic signal decreases, it becomes impossible to provide free field conditions in the low audible and infrasonic frequency bands due to acoustic wavelength alongation. For this reason, primary and secondary level calibrations of hydrophone elements in this frequency bands are generally carried out in pressure coupling chambers where the projector and hydrophone element are acoustically coupled.

Hydrophones calibrated in these structures are exposed to acoustic pressure which is expected to develop a uniform effect on the active area of the hydrophone. In order to develop such a pressure field, pressure coupling chamber must be of small dimensions relative to the wavelength of the acoustic signal. This condition is expressed as follows: In order for the acoustic pressure change to which active surface area of the hydrophone element in the pressure chamber is exposed, to be acceptable, the ratio of the maximum inner dimension (chamber dimensions) of the pressure coupling chamber to the wavelength of the acoustic signal generated in the chamber must be at least 1/16. For this reason, the inner dimensions of the pressure chamber determine the maximum operating frequency. Natural resonance frequencies that will occur as a result of the structural design of the pressure chamber also play a role in determining the upper frequency limit of the chamber. The internal medium of the pressure chamber can be determined as gas or liquid.

Projector elements are used as a source to generate an acoustic field in the pressure coupling chamber. These elements can be acoustic sources such as transducers, loudspeakers or piston structures. Piston units are drivers that consist of mechanical or piezoceramic structures. When piston units are used as a source, the acoustic pressure in the pressure chamber is calibrated by considering the information concerning the displacement occurring on the piston surface and the volume of the pressure coupling chamber. When piston structures are used, in terms of measurement uncertainty it is necessary to measure the volume of the pressure coupling chamber, the displacement on the piston structure, and the dimensions of the hydrophone structure and its positioning in the chamber with high precision.

When a loudspeaker is used as a source, the acoustic pressure inside the pressure coupling chamber is calibrated with the reference receiver unit. A microphone can be used as the reference receiver unit. Comparison measurements carried out by using a reference receiver are the secondary calibration method; the biggest uncertainty parameter that increases the measurement uncertainty is the uncertainty value at the measurement frequency of the reference receiver unit used as a reference. Furthermore, the lower limit of the frequency value in secondary calibration methods is related to the feasibility of low-frequency calibration of the reference receiver unit used as a reference.

In existing pressure coupling chamber calibrators, acoustic source elements are usually positioned on the same axis as the hydrophone element in order to reduce the volume of the pressure coupling chamber. Since the acoustic pressure in these structures will decrease along the horizontal section of the pressure chamber, the acoustic pressure to which the active surface of the hydrophone on the symmetry axis will be exposed will not be at the same level.

It is ensured that the acoustic pressure to which the active surface of the hydrophone on the axis of symmetry will be exposed, is equal on the entire surface when the maximum inner dimensions of the pressure coupling chamber are less than 1/16 of the wavelength of the acoustic signal.

Since the reference receiver unit, preferably the microphone, cannot operate in a flooded medium, the pressure chamber is filled with water to a level just below the microphone. In this case, it is known that the air-filled region to be formed between the hydrophone and the inner wall of the pressure chamber decreases the upper operating frequency of the chamber due to having limited viscosity and such a pressure coupling chamber design affects the measurements negatively.

Since the wavelength of the acoustic signal changes according to the medium where the sound velocity progresses, the operating frequency band of the pressure coupling chamber varies according to the medium properties. Medium inside the chamber can be either gas, usually air or liquid, for example, water or (castor) oil. Since the dimension limit, air filled pressure chamber usually operate up to frequencies 350-400 Hz and microphone element whose primary calibration was carried out can be used as the reference receiver unit in order to determine the acoustic pressure inside the chamber.

Calibration in liquid-filled chamber could be realized at higher frequencies than in gas-filled one because sound speed in liquids is much higher than in gases and acoustic wavelength in liquids is larger than in gases at the same frequency. When the coupling is filled with liquid, it is very important for the measurement uncertainty that the liquid forming the medium is completely free of air bubbles.

When the secondary calibration is selected and air medium is used in the pressure coupling chamber, a microphone with calibration traceability for air applications at lower frequencies is preferred as reference pressure sensor. When the pressure coupling chamber is full of water, hydrophone elements are used as the reference pressure sensor since the microphone element will not work in the aquatic medium.

In the U.S. Pat. No. 3,224,246 reflecting the state of the art, a system was developed for the calibration of hydrophone at low frequencies, where acoustic pressure was formed by a vibrating column. In the existing invention, acoustic pressure is formed inside the pressure coupling chamber.

Technical solutions of couplers for the comparison calibration and sensitivity evaluation are presented by the following patents:

United States Patent document numbered U.S. Pat. No. 3,659,255A, discloses a hydrophone calibrator. According to design, the hydrophone is placed in a water-filled chamber which is surrounded by a first piezoceramic cylinder which acts as a sinusoidal pressure source and a second piezoceramic cylinder which, together with the hydrophone, receives the sound produced by the first cylinder. Hydrophone, transmitting and receiving piezoceramic cylinders are mounted axially with the chamber. The voltage outputs of the second cylinder and the hydrophone are compared to determine the sensitivity of the hydrophone after the sensitivity of the second cylinder is determined by the introduction of a known step pressure change and measuring the amplitude of voltage generated by the second cylinder. Then, the voltage driving first piezoceramic cylinder is adjusted to receive the signal from the second piezoceramic cylinder of the same amplitude as it was when pressure step change was applied. Since the sensitivity of the receiving piezoceramic cylinder serving as the reference sensor and transmitting voltage response of the first piezoceramic cylinder are not really calibrated in the required frequency range, the disclosed chamber and method can be used only for the hydrophone sensitivity evaluation, but not for the calibration.

United States Patent document numbered U.S. Pat. No. 2,918,651A discloses a coupler for the confirmation of the hydrophone sensitivity whose calibration is known by a prior free field calibration. The coupler is made as a tube with one closed end, the second end of the tube serves to position and seal hydrophone inside coupler. Source of acoustical pressure is placed on the side wall of the chamber. Firstly, when free-field calibration is completed, the hydrophone is placed inside chamber and the frequency and voltage of driving signal are adjusted so that the signal emitted by the acoustic source will be of the same frequency as that which was used in the initial calibration of the hydrophone. The hydrophone output voltage is measured and the hydrophone is then put into use. Either periodically or whenever the calibration of the hydrophone is suspect, the hydrophone is recalibrated by repeating the above steps. In this way the change of the hydrophone sensitivity is measured with respect to initial free-field calibration.

United States patent document numbered US2015/0234089A1, Hydrophone Calibration System discloses calibration apparatus for the secondary calibration of hydrophones at frequencies as low as 0.001 Hz at hydrostatic pressures at least 5000 psi. The pressure coupling chamber of the system is fillable by liquid and acoustic pressure inside chamber is excited by piston. The longest dimension of the pressure chamber is less than 15 cm to allow the system to operate up to 500 Hz. Design of the system and, in particular of the pressure coupling chamber, meets the special requirements of the calibration at frequencies below a few Hz and high hydrostatic pressure. The type of the reference sensor is not specified.

United States Patent document numbered U.S. Pat. No. 4,205,394, Sealed Cavity Hydrophone Calibration, discloses apparatus and method for calibrating a hydrophone array comprising a plurality of electrically interconnected hydrophones over a range of acoustic signal frequencies having a lower limit on the order of 1 Hz. Apparatus includes a container having a sealed cavity for sealing the hydrophone array in a selected fluid, an electro-acoustic projector for projecting acoustic signals of frequencies selected from the frequency range into the sealed cavity, and a reference hydrophone contained within the sealed cavity for generating a reference signal in response to each projected acoustic signal. Apparatus further includes monitoring equipment coupled to the reference hydrophone and to the hydrophone array for enabling a selected characteristic of one of the reference signals to be compared with the same characteristic of a signal generated by the hydrophone array when an acoustic signal is projected into the sealed cavity. Due to large size of the pressure coupling chamber that houses the hydrophone array, the calibration is performed over a frequency from 1-2 Hz up to several tens of Hz.

REFERENCES

1) ANSI/ASA S1.20-2012 (Revision of ANSI S1.20-1988 (R2003))—Procedures for Calibration of Underwater Electroacoustic Transducers.
2) EN 60565 Underwater acoustics—Hydrophones—Calibration in the frequency range 0.01 Hz to 1 MHz.
3) Robert J. Bobber. Underwater Electroacoustic Measurements. Peninsula Publishing, 333 p., ISBN 0-932146-19-8.
4) Joseph F. Zalesak. Advances in Transfer Coupler Reciprocity. Proceedings of 2004 NCSL International Workshop & Symposium, Salt Lake City, Jul. 11-15, 2004.
5) W H Slater W. H., S E Crocker S. E., and S R Baker S. R. A primary method for the complex calibration of a hydrophone from 1 Hz to 2 kHz. Metrologia 55 (2018) 84-94.
6) F. Schloss et al, U.S. Pat. No. 3,224,246, Low Frequency Hydrophone Calibration, 1965.
7) Winfield James Trott, U.S. Pat. No. 3,659,255, Hydrophone Calibrator, 1972.
8) Edward Podolak et al., U.S. Pat. No. 2,918,651, Calibrator For Underwater Hydrophones, 1959.
9) Del Thomas Dakin, US 2015/0234089, Hydrophone Calibration System, 2015.
10) George O. Pickens, U.S. Pat. No. 4,205,394, Sealed Cavity Hydrophone Array Calibration, 1980.

The Technical Problem which the Invention Purports to Solve

When the air medium is used in the pressure chamber while performing the hydrophone calibration, the upper operating frequency limit is of about 350-400 Hz. In this case, Laboratory Standard LS1 and LS2 microphones are used as the reference pressure sensor, thus enabling highly precise secondary calibration.

Although the upper working frequency of the liquid filled pressure coupling chambers is higher than the gas filled ones, the reference pressure sensor is used as the reference hydrophone element and this hydrophone must be calibrated in the corresponding frequency range. Although methods have been determined in reference sources for low frequency calibration of reference hydrophone elements, there are difficulties in terms of application. Also, the calibration uncertainty of the hydrophone elements used as reference is higher than that of the reference microphones.

By means of the present invention, acoustic sources are located and evenly spaced around the pressure-sensitive active surface of the hydrophone element in the pressure chamber to make the pressure field homogeneous so that a hydrostatic pressure effect is obtained at the related frequency on the active surface of the hydrophone element in the pressure chamber. The medium in the pressure coupling chamber is air and is not subjected to a separate pressurization externally. The pressure inside the pressure coupling chamber is equal to the atmospheric pressure value in the medium in which it is located. By this application, the upper frequency limit of 350-400 Hz has been increased to at least 1000 Hz.

Objects of this Invention

Development of a pressure coupling chamber for secondary (comparison) calibration to increase the upper frequency limit of calibration from 50-400 Hz in the state of art to 1000 Hz.

Obtaining a more homogenous pressure field by placing acoustic sources around the pressure-sensitive active surface of the hydrophones inside the pressure coupling chamber and driving these acoustic sources in the same phase; and generating a hydrostatic pressure effect by developing equivalent pressure around the active surface of the hydrophone element in the pressure coupling chamber at the corresponding frequency.

For acoustic pressure measurements, the use of reference standard sensor with high precision and loudspeakers and development of a pressure coupling chamber with their appropriate placement.

For hydrophones that need calibration in the low frequency region, to provide an inexpensive calibration system that is reliable in performance and relatively easy to manufacture.

DESCRIPTION OF THE REFERENCES IN THE FIGURES

Figure 1:
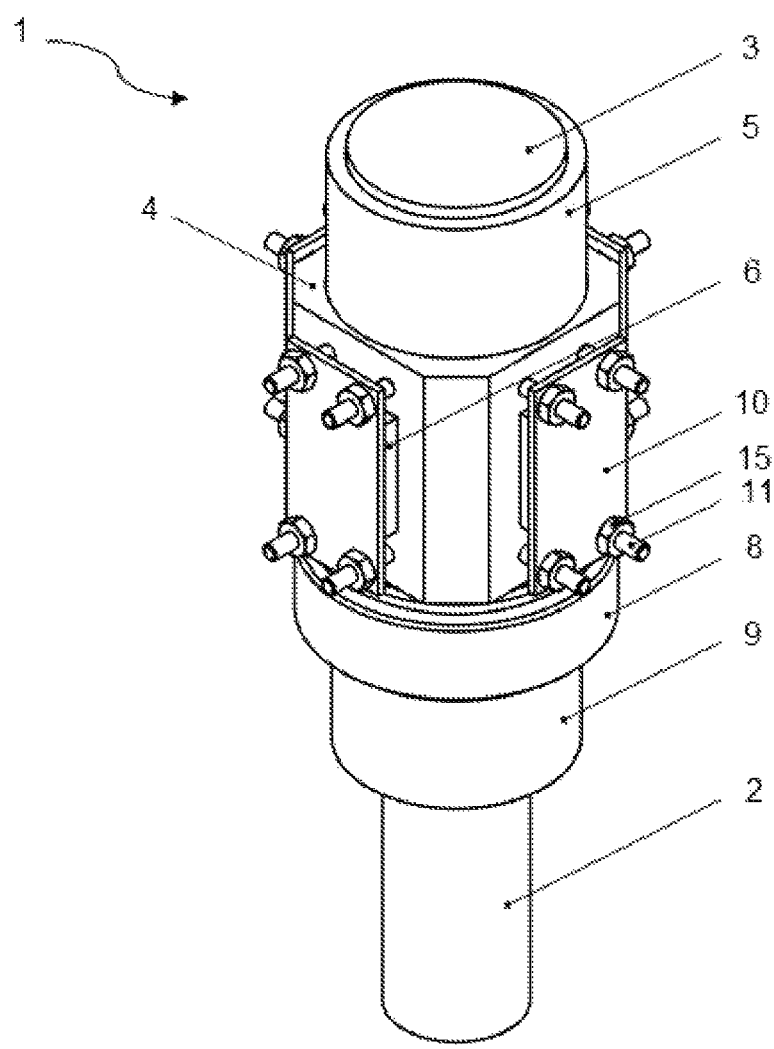
FIG. 1: Perspective drawing of the schematic image of the product that is the subject matter of the invention.
Figure 2:
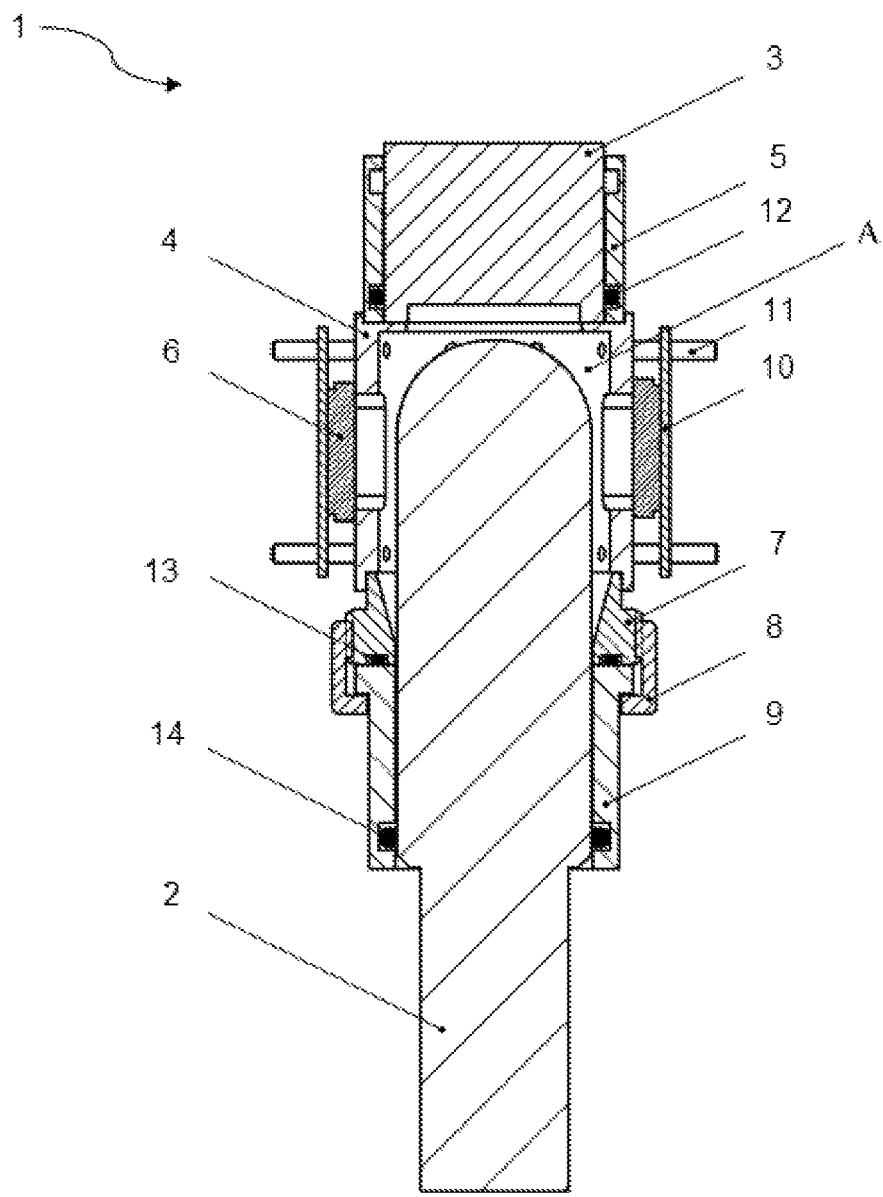
FIG. 2: Sectional drawing of the schematic image of the product that is the subject matter of the invention.

1. Pressure coupling chamber
2. Hydrophone
3. Reference receiver unit
4. Pressure coupling chamber body
5. Reference receiver unit sealing tube
6. Acoustic source
7. Thread adapter
8. Fastener for fixing thread adapter
9. Hydrophone adapter
10. Acoustic cap
11. Thread pin
12. Fastener for sealing the reference receiver unit
13. Fastener for sealing the thread adapter
14. Fastener for sealing the hydrophone
15. Fastener for fixing
A Internal medium of the pressure coupling chamber

DESCRIPTION OF THE INVENTION

In the pressure coupling chamber, that is the subject of the invention, the hydrophone (2) which is desired to be calibrated and the reference receiver unit (3) to be used during the comparison method are exposed to the same conditions in the pressure coupling chamber (1).

The acoustic pressure generated by acoustic sources (6) in the pressure coupling chamber (1) is determined by measuring with the reference receiver unit (3) and the value obtained is compared by the conversion of the voltage value, which is the output of the hydrophone (2) exposed to the same pressure, into acoustic pressure.

Hydrophone under calibration (2) and the reference receiver unit used as reference pressure sensor (3), mounted on the pressure coupling chamber body (4) with the loudspeaker cap (10), thread pin (11) and fastener for fixing (15), are exposed to the acoustic pressure generated preferably by at least 2 pieces of acoustic sources (6) depending on the dimensions of the pressure coupling chamber. Acoustic sources (6), placed preferably equidistance to face each other in the direction of the hydrophone (2) axis, are mounted to the pressure coupling chamber body (4) symmetrically. The hydrophone (2), which is placed in the pressure coupling chamber with the hydrophone adapter (9), is fixed by the thread adapter (7) and the fastener (8) suitable for fixing. Sealing is ensured between the parts that compose the pressure coupling chamber (1) by the suitable fasteners (12,13,14) for sealing. In order to expose the reference receiver unit (3) to the acoustic pressure generated in the pressure coupling chamber (1), the reference receiver unit (3) is mounted to the pressure coupling chamber body (4) with the reference receiver unit sealing tube (5).

How the Invention is Applied to the Industry

The present invention is designed for performing calibrations of electro-acoustic transducers used in the field of underwater acoustics (hydrophones (2)) in the frequency band from a few Hz up to 1000 Hz. While calibrations of such elements at frequencies 1000 Hz and higher are performed in test tanks, the acoustic wavelengths at lower frequencies approach the dimensions of the test tank so that the surface reflections of the test tank affect the measurement conditions. With the calibration structures expressed as the pressure coupling chamber (1), the upper frequency limit for hydrophone calibration can be increased from the state-of-the-art 350-400 Hz range to the level of 1000 Hz. The calibration device (1), which is the subject of the invention, can be transferred to the industry for the needs of primary and secondary calibration laboratories and research institutions working in this field.

*The Project Leading to this application has received funding from the EMPIR Programme co-financed by the Participating States and from the European Union's Horizon 2020 Research and innovation Programme

The invention claimed is:
1. A pressure coupling chamber (1), comprising;
   at least one hydrophone (2),
   at least one hydrophone adapter (9) intertwined with the hydrophone (2),
   a fastener for sealing the hydrophone (14) by sealing between the hydrophone (2) and the hydrophone adapter (9),
   At least one thread adapter (7) located at the top of the hydrophone adapter (9),
   a fastener for sealing the thread adapter (13) to provide sealing between the hydrophone adapter (9) and the thread adapter (7),
   a fastener for fixing the thread adapter (8) to the hydrophone adapter (9), a pressure coupling chamber body (4) located between the thread adapter (7) and a reference receiver unit sealing tube (5), an internal volume of the pressure coupling chamber (A) formed between the pressure coupling chamber body (4) and the hydrophone, at least two acoustic sources (6), located and evenly spaced around the pressure-sensitive active surface of a hydrophone element and mounted to the pressure coupling chamber body (4) symmetrically, at least one thread pin (11) and an acoustic cap (10) in the pressure coupling chamber body (4), and fixed with a fasteners for fixing (15) to the acoustic source cap (10), microphones (LS1 or LS2) as a reference receiver unit (3), at least one reference receiver unit (3) fixed to the upper part of the hydrophone (2) with fasteners for sealing the reference receiver unit (12) and sealed with the sealing tube (5), and air medium in the internal volume of pressure coupling chamber (A), that is not subjected to a separate pressurization externally.

2. A pressure coupling chamber (1) according to claim 1, characterized in that the reference receiver unit (3) is placed coaxially with the pressure coupling chamber body (4) and the hydrophone (2).

3. A pressure coupling chamber (1) according to claim 1, characterized in that the acoustic sources (6) are placed on the pressure coupling chamber body (4) equidistantly and symmetrically around the hydrophone (2), and driven in the same phase.

4. A pressure coupling chamber (1) according to claim 1, characterized in that the microphone (LS1 or LS2) is used as the reference receiver unit (3).

* * * * *